US008485436B2

(12) United States Patent
Bedore

(10) Patent No.: US 8,485,436 B2
(45) Date of Patent: Jul. 16, 2013

(54) SIMULATED CONTACTLESS IDENTIFICATION CARD READER

(75) Inventor: Jo Ann Bedore, Tappan, NY (US)

(73) Assignee: MasterCard International Incorporated, Purchase, NY (US)

( * ) Notice: Subject to any disclaimer, the term of this patent is extended or adjusted under 35 U.S.C. 154(b) by 27 days.

(21) Appl. No.: 12/418,920

(22) Filed: Apr. 6, 2009

(65) Prior Publication Data

US 2010/0252622 A1 Oct. 7, 2010

(51) Int. Cl.
*G06K 5/00* (2006.01)

(52) U.S. Cl.
USPC .......................................................... 235/380

(58) Field of Classification Search
USPC ........................... 235/435, 439, 487, 492, 380
See application file for complete search history.

(56) References Cited

U.S. PATENT DOCUMENTS

| 6,165,386 | A  | * | 12/2000 | Endo et al. ..................... 252/500 |
| 6,278,413 | B1 | * | 8/2001 | Hugh et al. ..................... 343/818 |
| 6,356,442 | B1 | * | 3/2002 | Lunsford ..................... 361/679.56 |
| 6,646,864 | B2 | * | 11/2003 | Richardson ..................... 361/679.3 |
| 6,786,407 | B1 | * | 9/2004 | Takasugi ..................... 235/451 |
| 2006/0022044 | A1 | * | 2/2006 | Smets et al. ..................... 235/451 |
| 2006/0157566 | A1 | * | 7/2006 | Kawasaki et al. ..................... 235/451 |
| 2009/0127345 | A1 | * | 5/2009 | Chamley et al. ..................... 235/492 |
| 2009/0294526 | A1 | * | 12/2009 | Maw ..................... 235/380 |
| 2009/0321510 | A1 | * | 12/2009 | Day et al. ..................... 235/375 |
| 2010/0176204 | A1 | * | 7/2010 | Li ..................... 235/492 |

* cited by examiner

*Primary Examiner* — Daniel Hess
*Assistant Examiner* — Steven J Malone
(74) *Attorney, Agent, or Firm* — Buckley, Maschoff & Talwalkar LLC

(57) ABSTRACT

A simulated contactless identification card reader includes an antenna adjacent a card presentation surface. The antenna is for exchanging wireless signaling with a contactless identification card presented to the card presentation surface. The contactless identification card reader may further include a detection unit coupled to the antenna to detect a presence of a contactless identification card, and an output indicator coupled to the detection unit to provide a user-perceivable indication when the detection unit detects a presence of a contactless identification card.

15 Claims, 4 Drawing Sheets

SIMULATED CONTACTLESS IDENTIFICATION CARD READER

BACKGROUND

Payment cards such as credit or debit cards are ubiquitous. For decades, such cards have included a magnetic stripe on which the relevant account number is stored. To consummate a purchase transaction with such a card, the card is swiped through a magnetic stripe reader that is part of a point of sale terminal. The reader reads the account number from the magnetic stripe. The account number is then used to route a transaction authorization request that is initiated by the point of sale terminal.

In pursuit of still greater convenience and more rapid transactions at point of sale terminals, payment cards have more recently been developed that allow the account number to be automatically read from the card by radio frequency communication between the card and a so-called "proximity reader" or "contactless reader" which may be incorporated with the point of sale terminal. In such cards, often referred to as "proximity payment cards" or "contactless payment cards", a Radio Frequency Identification ("RFID") Integrated Circuit ("IC," often referred to as a "chip") is embedded in the card body. A suitable antenna is also embedded in the card body and is connected to the RFID chip to allow the chip to receive and transmit data by RF communication via the antenna. In typical arrangements, the RFID chip is powered from an interrogation signal that is transmitted by the contactless reader and received by the card antenna.

MasterCard International Incorporated, the assignee hereof, has established a widely-used standard, known as "PayPass," for interoperability of contactless payment cards and contactless readers. Note that PayPass is not the only standard that has been established for contactless payment operations. For example, American Express has established a contactless payment communications standard that is called "ExpressPay", and Amex has issued contactless payment cards in its name that operate in accordance with the ExpressPay standard. Other contactless payment communication standards have also been established.

Despite the greater convenience offered by contactless payment card systems, some consumers who have not used them may be apprehensive about trying the systems. For example, a consumer might be nervous that he or she will hold or move the contactless card in the wrong way, resulting in an embarrassing inability to complete a transaction. Some consumers are so unsure of how the systems operate in practice they decide to completely forgo the use of contactless payment cards. Note that once a consumer uses his or her contactless payment card a few times, these concerns typically vanish and thereafter they freely and confidently use the card.

Thus, improved devices and methods associated with the introduction of contactless identification card system to consumers would be advantageous.

DETAILED DESCRIPTION

Figure 1:
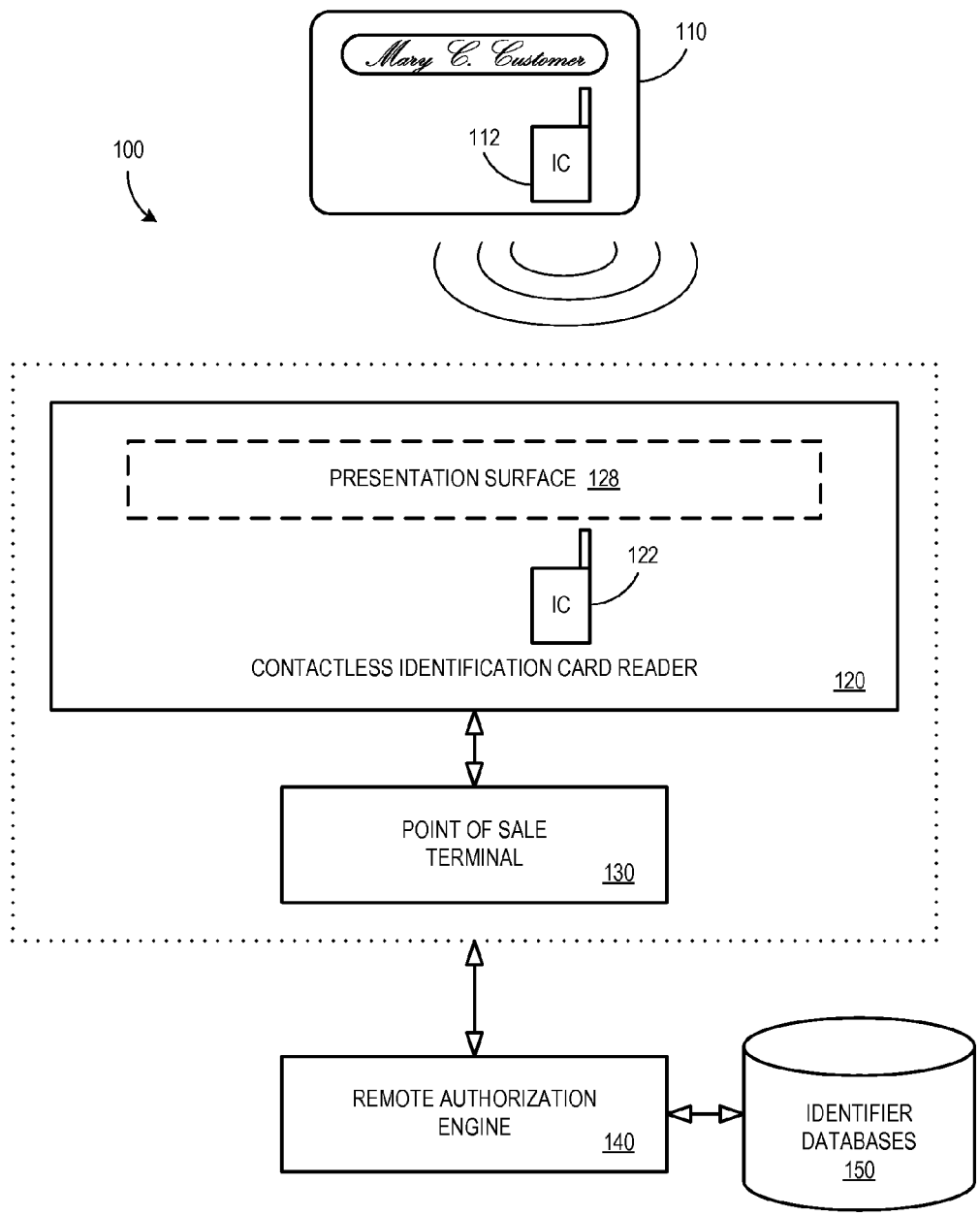
FIG. 1 is a schematic representation of a system wherein a contactless payment card is being presented to a typical contactless payment card reader.

FIG. 1 is a schematic representation of a system 100 wherein a contactless payment card 110 is being presented to a typical contactless payment card reader 120. According to some embodiments, the contactless payment card 110 may include a card-shaped plastic body. Note that the card-shaped plastic body may be of any convenient size, but preferably has the same dimensions as a standard identification card format such as the commonly used ID-1 standard format. Although a "payment" card 110 is illustrated in FIG. 1, note that embodiments of the present invention may be associated with other types of identification mechanisms, such as contactless debit cards, loyalty program cards, etc. Moreover, the term "card" may refer to any device or object that can be used to identify a person or account.

The contactless payment card 110 may further include an IC 112 embedded in and/or supported by the plastic body. In addition, the contactless payment card 110 may include an antenna that is coupled to the IC 112 and is embedded in and/or supported by the plastic body. For example, the antenna may be coupled to the IC 112 via terminals on the IC 112. According to some embodiments, the antenna may be a loop antenna consisting of a few turns of a conductive material.

The IC 112 of the contactless payment card 110 may include a control/data storage portion (not separately shown) and transmit/receive circuitry (not separately shown) by which the IC 112 may transmit and/or receive communications via the antenna. The IC 112 may for example operate in accordance with the above-mentioned PayPass standard.

Also not separately shown, but included in the IC 112, is circuitry that supplies power for the IC 112 from an interrogation signal received via the antenna. The contactless payment card 112 may be "passive" in the sense that it derives all of its power needs from the interrogation signal, and is inactive when not being interrogated or otherwise supplied with a power signal. Thus, in a preferred embodiment, the contactless payment card 110 does not include a battery.

Note that the functionality ascribed herein to the IC 112 may alternatively be embodied in a chip set, rather than in a single IC.

The contactless payment card reader 120 may, for example, be located at a retailer and/or be coupled to a local point of sale terminal 130. The contactless payment card reader 120 may further include a housing on which a keypad is mounted, and the keypad may be used by the customer to enter a Personal Identification Number (PIN) in connection with a purchase transaction with the retailer. The contactless payment card reader 120 may further include a display mounted in the housing for the purpose of providing information from the contactless payment card reader 120 to a customer. A swipe slot may also be formed in the housing to allow a magnetic stripe card to be swiped for reading by the contactless payment card reader 120. (Thus the example contactless payment card reader 120 shown in FIG. 1 could also have magnetic stripe reading functionality.)

The contactless payment card reader 120 may include an IC 122 and an antenna mounted adjacent a card presentation surface 128. The antenna may be a loop antenna and is provided for the purpose of exchanging wireless signaling with the contactless payment card 110. In some embodiments, the antenna may be embedded in the housing at the card presentation surface 128.

The IC 122 of the contactless payment card reader 120 may include electronic circuitry for controlling the contactless payment card reader 120 and for transmitting and receiving wireless communications to and/or from the contactless payment card 110. The control/transmit/receive circuitry may be coupled to the antenna (as well as to a local keypad and/or display). The control/transmit/receive circuitry may be configured so that the contactless payment card reader 120 supports and is selectively operable with a number of different contactless communication standards, including the PayPass standard and other standards.

In accordance with conventional practices, the contactless payment card reader 120 may read a customer's payment card account number via wireless communication from the contactless payment card 110 and may upload the customer's payment card account number to the point of sale terminal 130 via a communication signal path. The point of sale terminal 130 may, in turn, may use the customer's payment card account number in initiating, with a remote authorization engine 140 and associated identifier databases 150, a request for an authorization of a purchase transaction between the customer and the retailer.

MasterCard International Incorporated, the assignee hereof, has established a widely-used standard, known as "PayPass," for interoperability of contactless payment cards 110 and contactless readers 120. Note that PayPass is not the only standard that has been established for contactless payment operations. For example, American Express has established a contactless payment communications standard that is called "ExpressPay", and Amex has issued contactless payment cards in its name that operate in accordance with the ExpressPay standard. Other contactless payment communication standards have also been established. Embodiments described herein may be associated with any of these types of communication standards.

Despite the convenience offered by the contactless payment card system 100, some consumers who have not used it may be apprehensive about trying the system 100. For example, a consumer might be nervous that he or she will hold or move the contactless card 110 in the wrong way, resulting in an embarrassing inability to complete a transaction with the retailer. Some consumers are so unsure of how the system 100 operates in practice they decide to completely forgo the use of the contactless payment card 110. Note that once a consumer uses his or her contactless payment card 110 a few times, these concerns typically vanish and thereafter they freely and confidently use the card.

Figure 2:
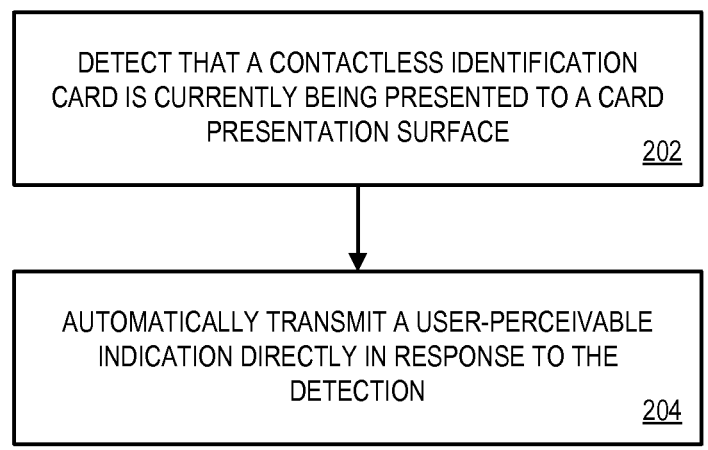
FIG. 2 is a method associated with a simulated contactless identification card reader according to some embodiments.

To help consumers feel more comfortable about using contactless payment cards, FIG. 2 is a method associated with a simulated contactless identification card reader according to some embodiments. The flow charts described herein do not necessarily imply a fixed order to the actions, and embodiments may be performed in any order that is practicable. Note that any of the methods described herein may be performed by hardware, software (microcode), or any combination of these approaches. For example, a storage medium may store thereon instructions that when executed by a machine result in performance according to any of the embodiments described herein.

At 202, a simulated contactless identification card reader may detect that a contactless identification card is being presented to a card presentation surface. The identification card might be associated with, for example, a contactless payment card (e.g., associated with a debit or credit account), an employee badge, or a consumer loyalty program. According to any of the embodiments described herein, a contactless identification card may also be associated with any type of contactless payment device, including wireless telephones. The contactless identification card reader may be considered "simulated," for example, because it does not receive, store, process, and/or facilitate an authorization in connection with an identifier of the contactless identification card being presented (e.g., of a credit card number) and/or does not communicate with any device outside the simulated contactless identification card reader other than the contactless identification card.

At 204, the simulated contactless identification card reader may automatically provide a user-perceivable indication directly in response to said detecting. For example, the user-perceivable indication might comprise a sound (e.g., a buzz or beep) or visual indication to the consumer. The consumer can then be confidently re-assured that he or she has held and/or moved the card properly in connection with the reader.

Figure 3:
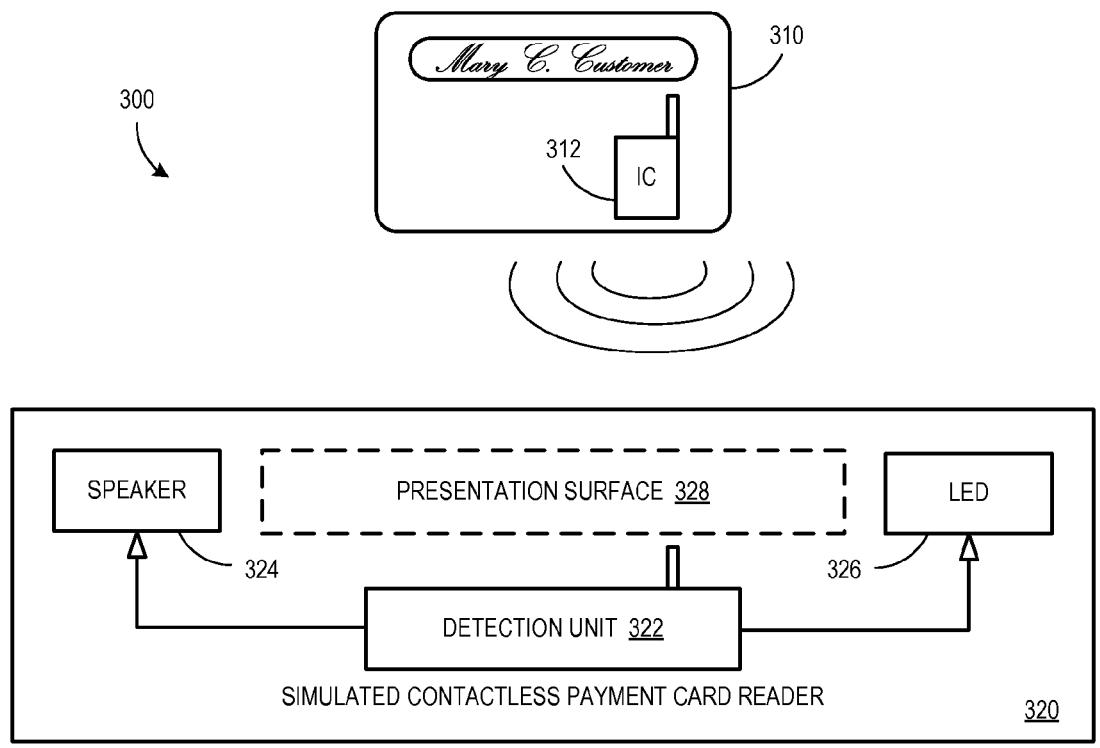
FIG. 3 is a schematic representation of system wherein a contactless identification card is being presented to a simulated contactless payment card reader according to some embodiments.

FIG. 3 is a schematic representation of a system 300 wherein a contactless identification card 310 is being presented to a simulated contactless payment card reader 320 according to some embodiments. According to some embodiments, the contactless payment card 310 may include a card-shaped plastic body. Note that the card-shaped plastic body may be of any convenient size, but preferably has the same dimensions as a standard identification card format such as the commonly used ID-1 standard format.

The contactless payment card 310 may further include an IC 312 embedded in and/or supported by the plastic body. In addition, the contactless payment card 310 may include an antenna that is coupled to the IC 312 and is embedded in and/or supported by the plastic body. For example, the antenna may be coupled to the IC 312 via terminals on the IC 312. According to some embodiments, the antenna may be a loop antenna consisting of a few turns of a conductive material.

The IC 312 of the contactless payment card 310 may include a control/data storage portion (not separately shown) and transmit/receive circuitry (not separately shown) by which the IC 312 may transmit and/or receive communications via the antenna. The IC 312 may, for example, operate in accordance with the above-mentioned PayPass standard.

Also not separately shown, but included in the IC 312, is circuitry that supplies power for the IC 312 from an interrogation signal received via the antenna. The contactless payment card 312 may be "passive" in the sense that it derives all of its power needs from the interrogation signal, and is inactive when not being interrogated or otherwise supplied with a power signal. Thus, in a preferred embodiment, the contactless payment card 310 does not include a battery.

Note that the functionality ascribed herein to the IC 312 may alternatively be embodied in a chip set, rather than in a single IC.

The simulated contactless payment card reader 320 may, for example, be included in a mailing that is sent to new or potential users of a contactless card system. The simulated contactless payment card reader 320 may further include a detection unit 322 and an antenna mounted adjacent a card presentation surface 328. The antenna may be a loop antenna and is provided for the purpose of exchanging wireless signaling with the contactless payment card 310. In some embodiments, the antenna may be embedded in the mailing at the card presentation surface 328.

The detection unit 322 of the simulated contactless payment card reader 320 may include electronic circuitry for controlling the simulated contactless payment card reader 320 and for transmitting and/or receiving wireless communications to and/or from the contactless payment card 310.

To help consumers feel more comfortable about using the contactless payment card 310, the detection circuit 322 of the simulated contactless identification card reader 320 may further be coupled to an output indicator to automatically provide a user-perceivable indication when the detection unit detects the contactless identification card 310. For example, the output indicator may be a speaker 324 to generate a sound (e.g., a buzz or a beep) when the detection unit 322 detects a presence of the contactless identification card 310. As another example, the output indicator may be a visual indicator, such as a Light Emitting Diode ("LED") 326 or Liquid Crystal Display ("LCD") that generates a visual indication when the detection unit 322 detects the contactless identification card 310. Upon receiving the confirmation from the speaker 324 and/or LED 326, the consumer can feel re-assured that he or she has held and/or moved the card 310 properly in connection with the simulated reader 320 (and that he or she will do so when facing an actual reader at a retail establishment). Note that some or all of the components of the system may include Near Field Communication ("NFC") short-range wireless connectivity components or similar elements.

The contactless identification card reader 320 may be considered "simulated," for example, because it does not receive, store, process, and/or facilitate an authorization in connection with an identifier of the contactless identification card being presented (e.g., from a remote authorization engine as in the system 100 of FIG. 1) and/or does not communicate with any device outside the simulated contactless identification card reader 320 other than the contactless identification card 310.

Figure 4:
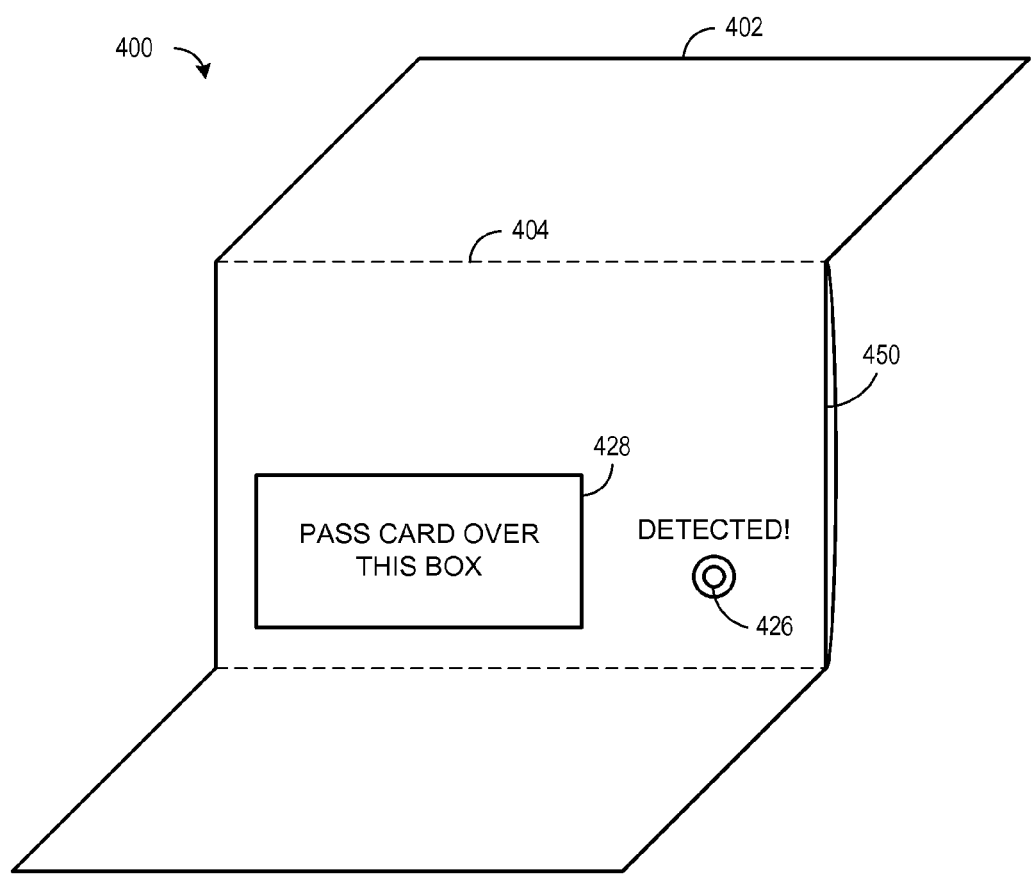
FIG. 4 illustrates an example associated with a simulated contactless payment card reader according to one embodiment.

FIG. 4 illustrates an example 400 associated with a simulated contactless payment card reader according to one embodiment. In particular, a paper mailing 402 may be sent to new or prospective customers who may use a contactless identification card. The mailing may include a substantially planar paper sleeve 450, such as a sleeve or envelope having a substantially flat, two-dimensional shape. Note that the "paper" sleeve 450 might be formed of cardboard, stock paper, or any other suitable material. According to some embodiments, the sleeve 450 is approximately the size of the paper mailing 402. According to other embodiments, the sleeve 450 instead is associated with only a portion of the paper mailing 402 (e.g., may be formed between creases 404 in the paper mailing 402 as illustrated in FIG. 4).

A simulated contactless identification card reader (such as the simulated reader 320 of FIG. 3) may be housed substantially within the sleeve 450 and may include an antenna, a detection unit, and/or an output indicator 426. In the case of an LED or similar type of output indicator 426, the output indicator 426 may be viewable through a hole in the sleeve 450. Note that the simulated reader may be attached to one or more sides of the paper sleeve 450. Moreover, a presentation surface 428 may comprise a visual representation printed on an outside surface of the paper sleeve 450. For example, as illustrated in FIG. 4, the presentation surface 428 may be a rectangle instructing a consumer to "pass card over this box." As another example, the presentation surface 428 might be a photograph or drawing of an actual contactless identification card reader.

According to some embodiments, a battery may also be housed substantially within the paper sleeve (e.g., to provide power to a detection unit and/or, indirectly, to a contactless identification card). In this case, the paper mailing 402 may further include a switch or other mechanism to disable the battery. For example, a consumer might need to remove a tab to enable the battery. As another example, the battery might be disabled unit a portion of the paper mailing 402 is unfolded. Such approaches may, for example, help prevent the battery from being used when not appropriate (e.g., to prevent mistaken use of the battery while in transit when the paper mailing 402 is sent to consumers along with an actual contactless identification card).

Thus, improved devices and methods associated with the introduction of contactless identification card systems to consumers may be provided by embodiments described herein. Moreover, the embodiments may be economically appropriate (e.g., because detection units do not include all of the functionality associated with actual card readers).

The present invention has been illustrated herein in the context of contactless payment cards and readers therefor. Nevertheless, the principles of the present invention are also applicable more generally to identification cards (and readers therefor) provided for applications other than payments. Examples of such applications may include loyalty program identification cards, transit system access cards, etc. Similarly, embodiments may be provided in connection with a wireless telephone, a Personal Digital Assistant ("PDA"), or any payment device capable of operating in connection with embodiments described herein.

Although the particular example of FIG. 4 is directed to a paper sleeve 450 of a paper mailing 402, note that embodiments may be practiced in other settings. For example, a simulated contactless card reader may be housed in a second rectangular plastic card (e.g., and the consumer might tap the actual card over the simulated reader card). As another example, simulated readers might be included in a kiosk, a store display, a billboard, a shopping cart, or any other location where it might be helpful to have consumers practice using contactless card (e.g., a sample contactless card might be chained to a display at a retail establishment, and the display might include a simulated reader to show consumers just how easy it is to use the system).

Moreover, although rectangular cards have been used herein as examples, note that contactless cards may take any other form, including a fob or disk attached to a keychain.

According to still other embodiments, a "simulated contactless identification card" may also be provided to consumers along with a simulated contactless identification card reader. For example, both a simulated contactless identification card (e.g., a card having some limited RFID capabilities but not an actual payment identifier) and a simulated contactless identification card reader might be mailed to potential consumers. The consumers could then use the two simulated components to practice presenting cards to readers thus familiarize themselves with contactless systems.

Yet other embodiments might have a contactless card itself detect a simulated reader. For example, a card (or a simulated card) might include a speaker or LED that activates when near either (i) an actual contactless card reader, or (ii) a simulated card reader including an IC embedded into a sheet of cardboard or paper that is mailed to new cardholders.

Although the present invention has been described in connection with specific exemplary embodiments, it should be understood that various changes, substitutions, and alterations apparent to those skilled in the art can be made to the disclosed embodiments without departing from the spirit and scope of the invention as set forth in the appended claims.

What is claimed is:

1. A simulated contactless identification card reader, comprising:
   an antenna adjacent a card presentation image printed on at least a portion of a substantially planar paper sleeve, the antenna, coupled to and housed substantially within the substantially planar paper sleeve, for exchanging wireless signaling with a contactless identification card presented to the card presentation surface;
a detection unit coupled to the antenna and the substantially planar paper sleeve to detect a presence of a contactless identification card; and
an output indicator coupled to the detection unit and the substantially planar paper sleeve to provide a user-perceivable indication when the detection unit detects a presence of a contactless identification card, wherein the simulated contactless card reader is not able to receive any data from the contactless identification card responsive to said detection, and further wherein the simulated contactless identification card reader is not able to directly or indirectly communicate data from the contactless identification card to any person or device outside the simulated contactless identification card reader.

2. The contactless identification card reader of claim 1, wherein the output indicator comprises a speaker to generate a sound when the detection unit detects a presence of a contactless identification card.

3. The contactless identification card reader of claim 1, wherein the output indicator comprises a visual indicator to generate a visual indication when the detection unit detects a presence of a contactless identification card.

4. The contactless identification card reader of claim 1, wherein
the detection unit and the output indicator are housed substantially within the paper sleeve.

5. The contactless identification card reader of claim 1, wherein the presentation image comprises a visual representation printed on an outside surface of the paper sleeve.

6. The contactless identification card reader of claim 1, further comprising:
a battery housed substantially within the paper sleeve.

7. The contactless identification card of claim 1, wherein the contactless identification card comprises a contactless payment device.

8. In combination, a simulated contactless identification card reader and a contactless identification card in proximity to the contactless identification card reader;
the simulated contactless identification card reader including:
an antenna adjacent a card presentation image, the antenna for exchanging wireless signaling with a contactless identification card presented to the card presentation image,
a detection unit coupled to the antenna to detect a presence of a contactless identification card,
an output indicator coupled to the detection unit to provide a user-perceivable indication when the detection unit detects a presence of a contactless identification card, wherein the simulated contactless card reader is not able to receive any data from the contactless identification card responsive to said detection, and further wherein the simulated contactless card reader is not able to directly or indirectly communicate data from the contactless identification card to any person or device outside the simulated contactless identification card reader, and
a substantially planar paper sleeve, wherein the antenna, the detection unit, and the output indicator are housed substantially within the paper sleeve; and
the contactless identification card including:
a card-shaped plastic body,
an antenna embedded in the plastic body, and
at least one integrated circuit embedded in the plastic body and coupled to the antenna, the antenna for exchanging wireless signaling with the contactless identification card reader.

9. The combination of claim 8, wherein the output indicator of the contactless identification card reader comprises a speaker to generate a sound when the detection unit detects a presence of a contactless identification card.

10. The combination of claim 8, wherein the output indicator of the contactless identification card reader comprises a visual indicator to generate a visual indication when the detection unit detects a presence of a contactless identification card.

11. The combination of claim 8, wherein the presentation image comprises a visual representation printed on an outside surface of the paper sleeve.

12. The combination of claim 8, wherein the contactless identification card comprises a contactless payment device.

13. A method, comprising:
detecting at a battery-powered portable detection unit that a contactless identification device is currently being presented to a card presentation image printed on at least a portion of a substantially planar paper sleeve, wherein the detection unit is affixed to and housed substantially within the substantially planar paper sleeve; and
automatically transmitting a user-perceivable indication directly in response to said detecting, wherein the simulated contactless card reader is not able to receive any data from the contactless identification device responsive to said detection, and further wherein the simulated contactless card reader is not able to directly or indirectly communicate data from the contactless identification device to any person or device outside the simulated contactless identification card reader.

14. The method of claim 13, wherein the user-perceivable indication comprises at least one of: (i) a sound, or (ii) a visual indication.

15. The method of claim 13, wherein the contactless identification device comprises at least one of: (i) a contactless payment card, and (ii) a wireless telephone.

* * * * *